United States Patent [19]
Schmidt

[11] Patent Number: 5,242,154
[45] Date of Patent: Sep. 7, 1993

[54] TORQUE LIMITER FOR WHEEL-LIFT MECHANISM

[75] Inventor: Horst Schmidt, Windsor, Canada
[73] Assignee: Build-A-Mold Limited, Canada
[21] Appl. No.: 753,399
[22] Filed: Aug. 30, 1991

Related U.S. Application Data

[63] Continuation-in-part of Ser. No. 713,427, Jun. 10, 1991, which is a continuation-in-part of Ser. No. 713,425, Jun. 10, 1991.

[51] Int. Cl.[5] ............................ B66D 1/04; F16H 1/10
[52] U.S. Cl. ..................................... 254/323; 254/903; 414/463; 464/34; 464/39
[58] Field of Search ................ 254/323, 903; 414/463; 464/34, 37, 38, 39

[56] References Cited

U.S. PATENT DOCUMENTS

| | | | |
|---|---|---|---|
| 2,848,883 | 8/1958 | Dall'Olio | 464/34 |
| 4,180,990 | 1/1980 | Hill | 464/37 |
| 4,261,453 | 4/1981 | Kunze | 464/37 X |
| 4,344,306 | 8/1982 | Citron | 464/34 |
| 4,969,630 | 11/1990 | Denman et al. | 254/903 X |

*Primary Examiner*—Michael S. Huppert
*Assistant Examiner*—Janice Krizek
*Attorney, Agent, or Firm*—Howard & Howard

[57] ABSTRACT

A wheel-lift mechanism is disclosed which incorporates a unique torque limiting structure. A drive is transmitted to a first shaft, which is in turn transmitted to a second shaft. The second shaft drives a reel for raising and lowering a flexible lift member and an attached wheel hub from beneath a vehicle. The torque limiting structure consists of an outer drive member which has an inner periphery including a plurality of ears which are received within notches in an inner driven member. The first shaft rotates the outer drive member and the inner driven member in turn rotates the second shaft. Should the relative torque transmitted from the first shaft to the second shaft exceed a predetermined limit, the ears deform the notch radially inwardly and the outer drive member slips relative to the inner driven member. Nodes are positioned radially outwardly of the notches on each circumferential side. A space is formed radially inwardly of the notch in the inner driven member. The space facilitates the bending of the notch radially inwardly. The space further has portions which conform to the shape of the nodes. The nodes deform radially inwardly to facilitate slippage of the ears around the nodes, and allow each ear to become aligned with a circumferentially-spaced subsequent notch once slippage does occur.

8 Claims, 3 Drawing Sheets

TORQUE LIMITER FOR WHEEL-LIFT MECHANISM

This application is a continuation-in-part of U.S. Ser. Nos. 07/713,427 and 07/713,425 both filed on Jun. 10, 1991.

BACKGROUND OF THE INVENTION

This application relates to a torque limiter for use with a mechanism for raising and lowering a wheel hub relative to a vehicle body.

Several types of lift mechanisms are known for raising and lowering a spare wheel from a storage position beneath a vehicle body. These systems may be powered manually by inserting an elongate tool into a shaft and turning the shaft. In these prior art mechanisms, it sometimes becomes difficult to transmit rotation from the shaft to the device for raising and lowering the wheel hub. Thus, there has been occurrences in the prior art of either the shaft or device for raising and lowering the wheel hub binding relative to the other. This is, of course, undesirable and can result in damage to the mechanisms.

SUMMARY OF THE INVENTION

In a disclosed embodiment of the present invention, a shaft drives a first structure which in turn drives a reel for raising and lowering a cable connected to a wheel hub. A torque limiter is disposed between the shaft and the reel. Should there be an undesirably large force between the shaft and reel, the torque limiter allows the shaft to move out of engagement and slip relative to the reel, rather than damage the mechanism.

In another aspect of the present invention, a unique torque limiter is disclosed which is molded from a resilient plastic. The torque limiter is formed of an outer drive section which has an inner periphery with a plurality of circumferentially-spaced radially inwardly extending ears. An inner driven member is received within the inner periphery, and is fixed to a shaft for rotating the reel. The ears in the outer drive member are aligned with notches in the outer periphery of the inner member. When the ears are received in those notches they transmit drive to the inner driven member, which in turn transmits drive to the reel for raising and lowering the wheel hub.

The inner driven member is preferably formed with outwardly curved spaces radially inwardly of the notches. The spaces allow the notches to flex radially inwardly should an overly large force be directed from the ears into the notch. Thus, should an overly large force be transmitted from the outer drive member to the inner driven member, the notch flexes inwardly into the space, such that the ear may pass along the notch, and the outer drive member slips relative to the inner driven member.

Nodes are formed on each circumferential side of each notch, with the nodes extending to a position radially outwardly of the position of the notches. The nodes assist in assuring that the ears are retained in the notches until an overly large force is encountered. Further, the spaces have sections which are curved inwardly at circumferential positions aligned with the nodes. These spaces assist the nodes in flexing radially inwardly once some slippage does occur such that the ears can become aligned with the next adjacent notches.

These and other objects and features of the present invention can be best understood from the following specification and drawings, of which the following is a brief description.

DETAILED DESCRIPTION OF A PREFERRED EMBODIMENT

Figure 1:
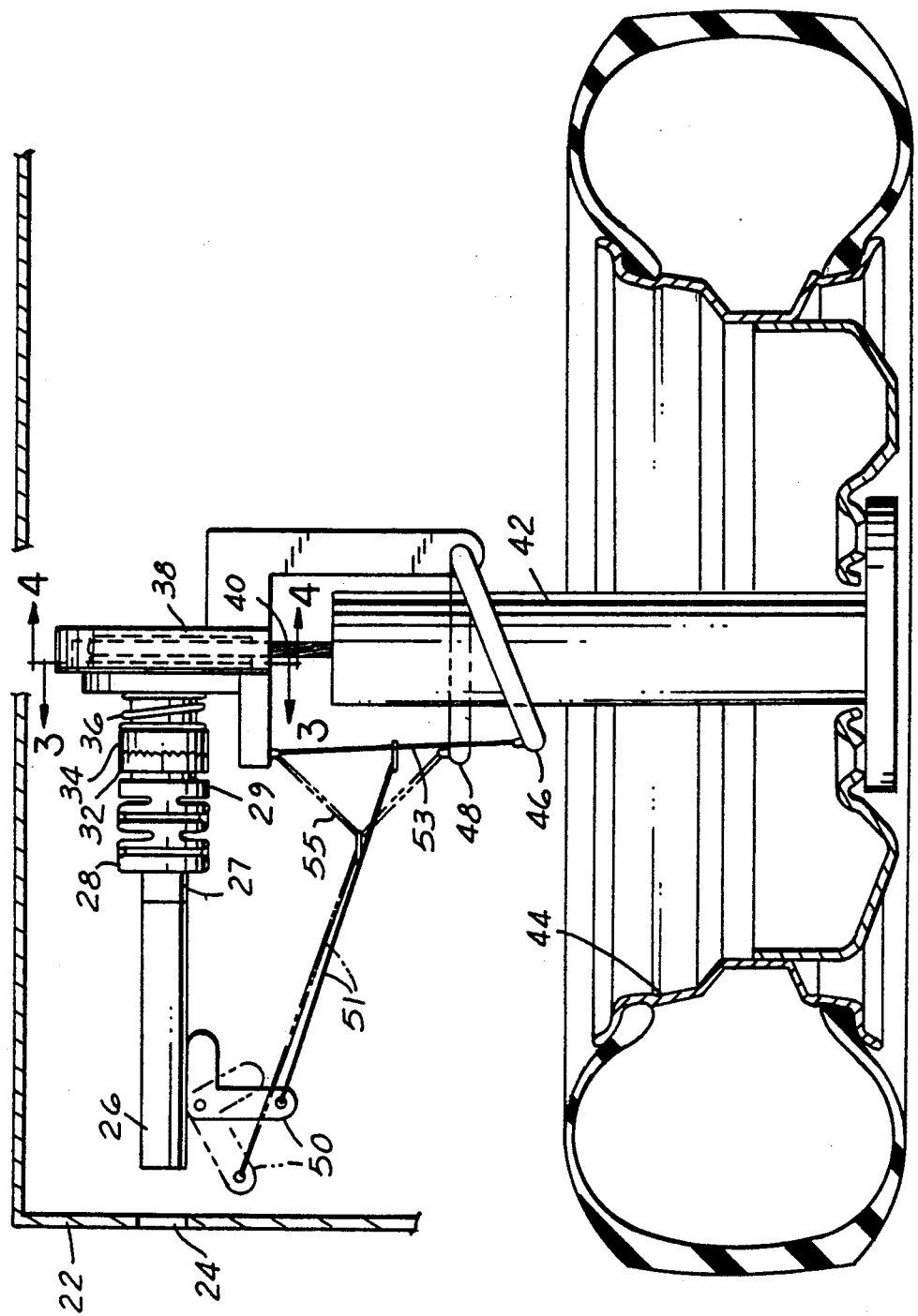
FIG. 1 is a largely schematic view of a tire-lift system incorporating the inventive coupling.

As illustrated in FIG. 1, wheel-lift system 20 is mounted beneath vehicle body 22. Access hole 24 extends through the rear of vehicle body 22. Hole 24 may typically extend through the rear of a van or similar vehicle. The size of vehicle body 22 relative to the size of wheel-lift system 20 is reduced to better illustrate the components of wheel-lift system 20.

Wheel-lift system 20 includes first shaft 26 connected to shaft coupling 27 at one end of a one-piece flexible coupling 28. A similar shaft coupling 29 is connected to first toothed member 32, which is engaged with a second toothed member 34. Toothed member 34 is biased by spring 36 into toothed member 32, and provides a first embodiment torque limiting structure. Should the force between members 32 and 34 overcome the force of spring 38, member 34 moves out of mesh with member 32, and drive is no longer transmitted. Toothed member 34 drives a rotary transmission within housing 38, which raises and lowers cable 40. One end of cable 40 is fixed in tee 42, which is received in the hub 44 of a tire. By raising and lowering cable 40 one may raise and lower the tire.

Lock member 46 is normally pivoted to an angle which is non-perpendicular to the axis of tee 42. An aperture in lock member 46 is received on tee 42. When lock member 46 is in this position, it grips tee 42 and provides an override lock, preventing lowering of the tire should cable 40 break, or be inadvertently lowered. When lock member 46 is pivoted to a release position, shown in phantom 48, the aperture no longer grips the outer periphery of tee 42 and the tire can be lowered. Pivot member 50 is pivoted to pull cable 51 which pulls a second cable 53 to a release position 55, shown in phantom, which in turn moves lock member 46 to released position 48.

To operate system 20, an implement is inserted through hole 24 and into shaft 26. Shaft 26 as depicted in FIG. 1 is pivoted downwardly, and lever 50 pivots forwardly such that lock member 46 is moved to phantom position 48. Shaft 26 may then be turned such that cable 40 and tire hub 44 are lowered to the ground.

Figure 2:
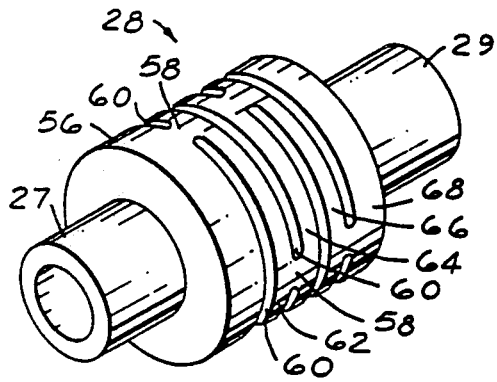
FIG. 2 is a perspective view of the inventive coupling.

One-piece coupling 28 is illustrated in FIG. 2. First shaft connector 27 is formed at one end, while second shaft connector 29 is formed at the other end. First disc 56 is formed integrally with shaft connector 27 and a connection post 58 connects first disc 56 to a second disc 62. Slots 60 are formed between discs 56 and 62 on each circumferential side of post 58. Similarly, posts 58 and slots 60 are formed between second disc 62 and a third disc 64. Two posts 58 are preferably formed between each pair of discs, although only one is illustrated. Posts 58 between first disc 56 and second disc 62 are offset 90° from the posts between second disc 62 and the third disc 64. Posts 58 and slots 60 are also formed between third disc 64 and a fourth disc 66. Posts 58 are positioned similar to those between first disc 66 and second disc 62. A fourth disc 66 is connected to fifth disc 68 through posts 58 which are positioned similar to that between second and third discs 62, 64. The tire-lift mechanism generally is the subject of co-pending application Ser. No. 07/713,427. Coupling 28 is the subject of co-pending application Ser. No. 07/713,425.

When a shaft connected to shaft coupling 27 is pivoted relative to the remainder of coupling 28, such as would happen in the system shown in FIG. 1 when shaft 26 is pivoted downwardly, rotation is still transmitted from shaft coupling 27 to shaft coupling 29. Slots 60 allow discs to flex about posts 58 and take up the difference in the angles between the couplings 27 and 29. Torque can still be transmitted through coupling 28 such that devices connected to shaft coupling 29 can still be powered.

The discs are preferably solid cylinders, the posts are preferably cylindrical and the connectors are preferably hollow. Such shapes optimize torque transfer and flexibility.

In designing shaft 28, one may vary the cross-sectional area of posts 58, and the thickness of the discs to increase the ability to transmit torque. Further, the length of posts 58, which is equal to the spacing between the discs, may be varied. Generally, the greater the area of posts 58 or the thickness of the discs, the greater the torque that can be transmitted. The length of the post has the opposite effect. As this ability to transmit torque increases, the ability to transmit rotation at distinct angles, or the flexibility of the coupling, decreases. Shear equations are commonly known for determining the torque a coupling will transmit without failure.

Figure 3:
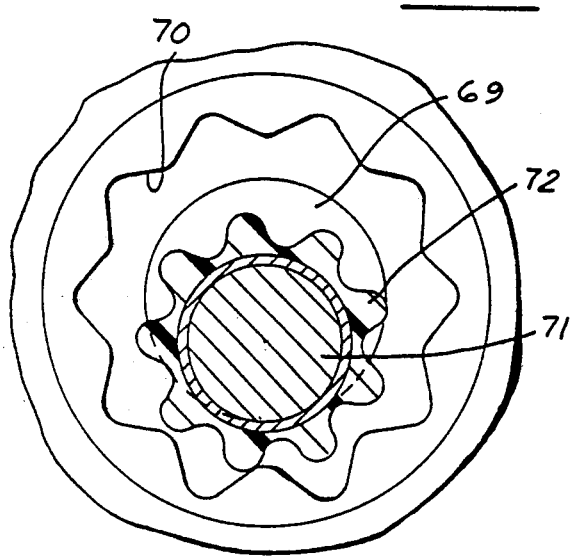
FIG. 3 is a cross-sectional view along line 3—3 as shown in FIG. 1.

FIG. 3 is a view along line 3—3 as shown in FIG. 1. When toothed gear 34 is rotated by toothed gear 32, see FIG. 1, it rotates shaft 69. An internally toothed gear 70 is fixed and integral with housing 38. Shaft 69 has an eccentric shaft 71 which receives an externally toothed gear 72. Gear 72 is fixed to rotate with a reel within housing 38, as will be described below. When shaft 69 rotates it rotates shaft 71, which moves gear 72 along gear 70, causing gear 72 to counter-rotate about shaft 71. By varying the relative number of teeth on gears 70 and 72, one controls the ratio between the input and output for driving the reel within housing 38.

Figure 4:
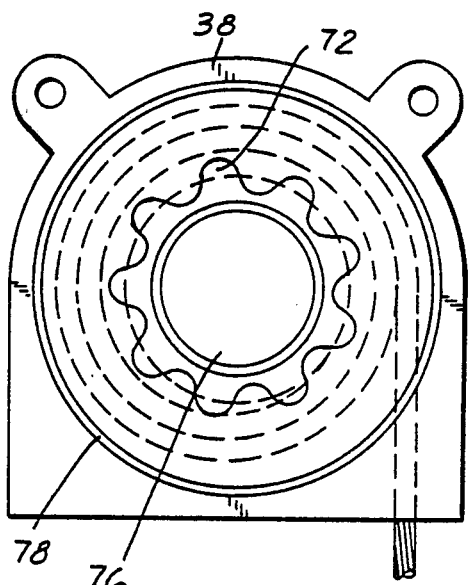
FIG. 4 is a cross-sectional view along line 4—4 as shown in FIG. 1.

FIG. 4 is a view along line 4—4 and shows shaft 76 which is integrally attached to shaft 71. Gear 72 is fixed to a face of reel 78, and reel 78 moves with gear 72 as it walks along gear 70. Cable 80 is received on reel 78 and within housing 38.

When toothed gear 34 rotates, it rotates shaft 71, which moves gear 72, and the integral reel 78. Cable 80 is moved into or out of housing 38. In this way wheel hub 44 may be raised and lowered.

Figure 5:
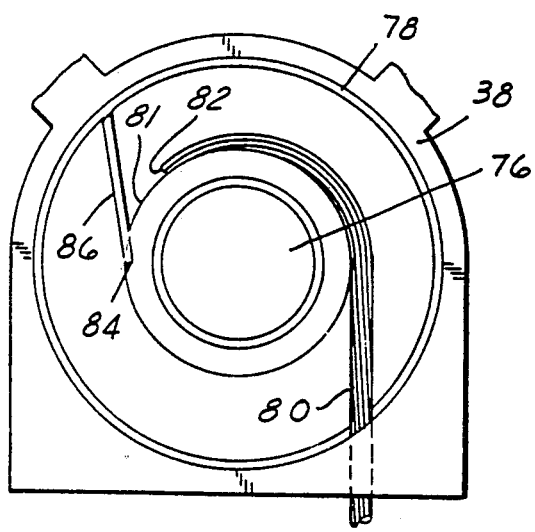
FIG. 5 is a view similar to FIG. 4, but showing the tire lowered.

As shown in FIG. 5, one end 82 of cable 80 is fixed to an inner portion 81 of reel 78. Spring finger 86 is biased radially inwardly relative to shaft 76 and catches notch 84 in reel 78 once all cable 80 has moved off of reel 78. Finger 86 locks in notch 84, such that reel 78 cannot be rotated any further. This defines a stop, preventing further lowering of cable 80.

Figure 6:
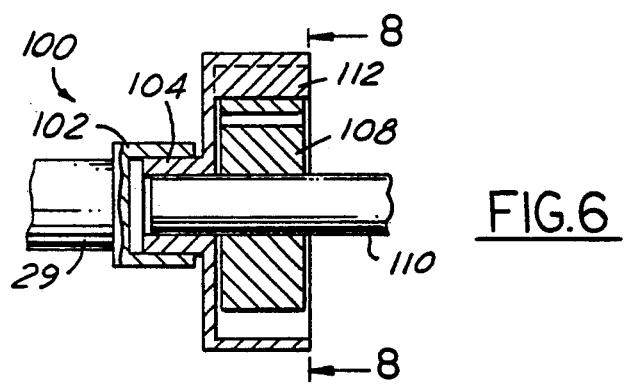
FIG. 6 is a cross-sectional view through a second embodiment torque limiter for use in the present invention.

A second embodiment torque limiter 100, shown in FIG. 6, may be substituted for the earlier disclosed embodiment. In this embodiment shaft 29 includes a cup 102 which drives a boss 104 from an outer drive member 106. Outer drive member 106 meshes with an inner driven member 108, which is fixed to a shaft 110. Shaft 110 drives structure within housing 38 for raising and lowering the cable 40. A plurality of ear 112 are formed at an inner periphery of outer drive member 106 and mesh with inner driven member 108. An end of shaft 110 is journaled within cup 104.

Figure 7:
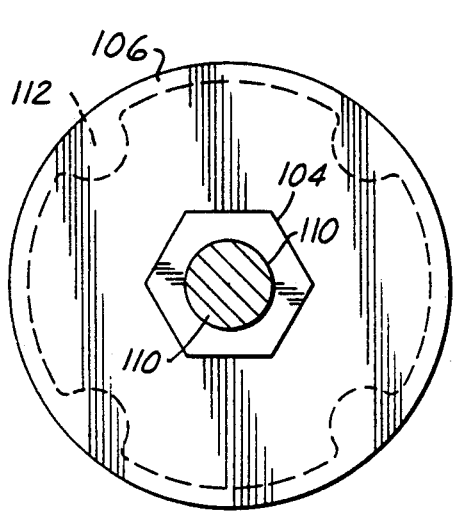
FIG. 7 is an end view of a portion of the second embodiment torque limiter.

FIG. 7 is an end view of outer drive member 106 with cup 102 removed. As shown, boss 104 has a hexagonal outer periphery which receives a mating inner periphery on cup 102. In this way cup 102 positively drives outer drive member 106.

Figure 8:
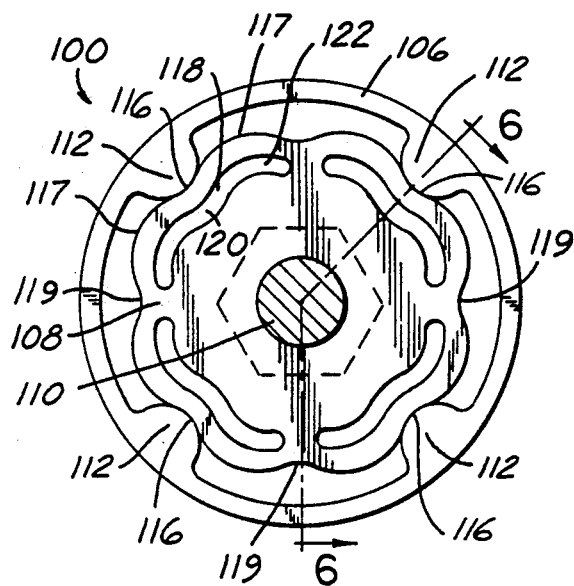
FIG. 8 is a cross-sectional view through the torque limiter illustrated in FIG. 6.

As shown in FIG. 8, outer drive member 106 comprises a plurality of circumferentially-spaced ears 112. Ears 112 are received in grooves 116 formed in the outer periphery of inner driven member 108. When ears 112 are received within notches 116, rotation is transmitted from outer drive member 106 to inner driven number 108. Notches 116 are spaced between radially outwardly extending nodes 117. Further, a space 118 is formed radially inwardly of notches 116 and extends circumferentially to positions radially inwardly of nodes 117. A central portion 120 of space 118 is curved radially outwardly, while circumferential portions 122 are curved radially inwardly. The shape of space 118 roughly conforms to the outer periphery of inner driven member 108.

When drive is transmitted from outer drive member 106 to inner driven member 108, and a force is encountered which exceeds the forces normally encountered by this system, notch 116 may flex radially into space 120 such that ear 112 can pass along the outer periphery of inner driven member 108. If so, outer drive member 106 can slip relative to inner driven member 108. This avoids damage to the system.

Point 119 is not a notch, since space 120 is not aligned. Rather ear 112 will pass point 119, and go to the next notch 116, when there is slippage.

Figure 9:
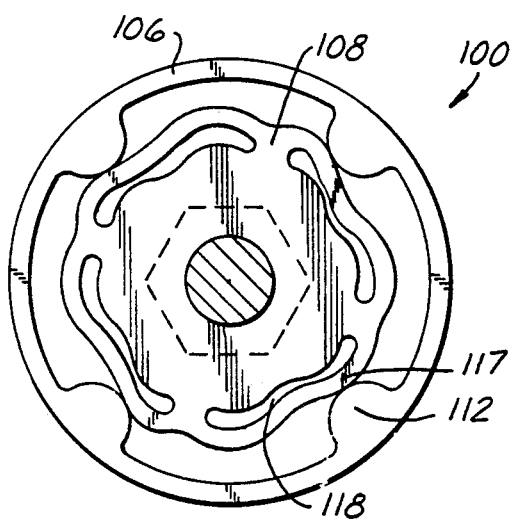
FIG. 9 shows a view similar to that shown in FIG. 8, but showing the torque limiter allowing slippage.

In the position shown in FIG. 9, ears 112 have deformed notch 116 into space 118, and have moved along the outer periphery of inner driven member 108. In a short period after the illustrated position, ear 112 will have moved circumferentially relative to driven member 108 such that ear 112 is now aligned with the next spaced circumferential notch 116. Space portions 122 facilitate the inward bending of nodes 117. Ear 112 enters the next notch and begins to drive inner driven member 108. If the binding that caused the original slippage of the two members still exits, outer drive member 106 will again slip relative to inner driven member 108.

In one embodiment, the force necessary to cause ears 112 to slip out of the notches 116 was approximately 24 foot pounds. By changing the thickness of the material between spaces 118 and notches 116 and nodes 117, this force can be easily adjusted. The thinner the material between the notches and the space, the lower the force required to achieve slippage. In one preferred embodiment the portions of the torque limiter were formed of a suitable Nylon.

It is preferred that the one-piece flexible coupling be injection molded. The mold body would preferably have structure to form the discs, posts 58, slots 60, and shaft couplings 27 and 29. By cooling the shaft coupling portions 27 and 29 quicker than the discs or posts, the shaft couplings will become more rigid.

The cable is preferably braided steel, stainless steel or a strong fiber. The other members are all preferably formed from a suitable plastic.

In one preferred embodiment of the present invention coupling 28 had 6 spaced discs. The discs were 0.50 inches in axial length, and 1.5 inches in diameter. Slots 60 between the adjacent discs were 0.6 inches in length. Posts 58 were cylinders that were 0.25 inches in diameter. The joint is preferably formed of a nylon, and preferably one available under the trade name Nylon 6/6.

Although coupling 28 is preferably injection molded, with mold body portions forming slots 60 and posts 58, it should be understood that other ways of forming coupling 28 may be utilized. As an example, coupling 28 could be molded as a one-piece cylindrical item without slots 60. Slots 60 could then be cut into the cylindrical body. Further, although coupling 28 is preferably formed from plastic, other polymers such as molded rubber may be used.

A single housing can enclose the torque limiter and the cable reel. Gear 70 may be integrally molded with the housing.

A preferred embodiment of the present invention has been disclosed, however, a worker of ordinary skill in the art would recognize that certain modifications would come within the scope of this invention. For that reason the following claims should be studied in order to determine the true scope and content of the invention.

I claim:

1. A wheel-lift mechanism comprising:
   a first shaft adapted to transmit rotation to a second shaft;
   said second shaft being connected to a reel for raising and lowering a flexible lift member, said flexible lift member being operatively connected to a wheel hub to raise and lower a wheel hub;
   a torque limiting structure disposed between said first and second shafts to limit the amount of torque transmitted from said first shaft to said second shaft;
   said torque limiting structure consists of a first outer member having a plurality of radially inwardly extending ears arranged around an inner periphery, and an inner member having a plurality of notches arranged around an outer periphery wherein the ears selectively contact the outer peripheral surface of said notches to transmit rotation between the inner and outer members, the notches being deformed radially inwardly to allow said outer member to slip relative to said inner member should a torque above the torque limit be applied to the first outer member; and
   said inner member has a pair of radially outwardly positioned nodes circumferentially spaced on each side of each of said notches.

2. The wheel-lift mechanism as recited in claim 1, wherein said first shaft is connected to said first outer member and said second shaft is connected to said inner member.

3. The wheel-lift mechanism as recited in claim 1, wherein a space is formed radially into said inner member at a circumferential position aligned with and spaced slightly radially inwardly from said notch, said space allowing said notch to be deformed radially inwardly to allow said first outer member to slip relative to said inner member.

4. The wheel-lift mechanism as recited in claim 3, wherein said space has a central portion curved about a center positioned outwardly of the outer periphery of said inner member and circumferentially aligned with said notches, and a pair of circumferentially-spaced portions aligned with said nodes, and curved about a center axis of said inner member.

5. A torque limiter for limiting the amount of torque transferred between a first shaft and a second shaft, the torque limiter comprising:
   an outer member having a plurality of radially inwardly extending ears arranged around an inner periphery;
   an inner member having a plurality of notches arranged around an outer periphery, wherein said ears selectively contact the outer peripheral surface of said notches to transmit rotation between said inner and outer members, said notches being deformed radially inwardly to allow said outer member to slip relative to said inner member should a torque above a predetermined torque limit be applied to said outer member;
   said inner member has a pair of radially outwardly positioned nodes circumferentially spaced on each side of each of said notches.

6. The torque limiter as recited in claim 5, wherein said outer member is connected to a drive shaft and said inner member is connected to a driven shaft.

7. The torque limiter as recited in claim 5, wherein a space is formed radially into said inner member at a circumferential position aligned with and spaced slightly radially inwardly from each of said notches, said spaces allowing said notches to be deformed radially inwardly to allow said outer member to slip relative to said inner member.

8. The torque limiter as recited in claim 7, wherein said spaces have a central portion curved about a center positioned outwardly of said outer periphery of said inner member and circumferentially aligned with said notches, and a pair of circumferentially-spaced portions aligned with said nodes, and curved about a center spaced inwardly of said inner member.

* * * * *